United States Patent
Aikawa

(10) Patent No.: US 8,437,078 B2
(45) Date of Patent: May 7, 2013

(54) BINOCULARS

(75) Inventor: Yasuyuki Aikawa, Kawasaki (JP)

(73) Assignee: Nikon Vision Co., Ltd., Tokyo (JP)

( * ) Notice: Subject to any disclaimer, the term of this patent is extended or adjusted under 35 U.S.C. 154(b) by 408 days.

(21) Appl. No.: 12/709,303

(22) Filed: Feb. 19, 2010

(65) Prior Publication Data

US 2010/0142044 A1 Jun. 10, 2010

Related U.S. Application Data

(63) Continuation of application No. PCT/JP2008/065792, filed on Aug. 27, 2008.

(30) Foreign Application Priority Data

Sep. 26, 2007 (JP) ................................ 2007-248772

(51) Int. Cl.
*G02B 23/00* (2006.01)

(52) U.S. Cl.
USPC ............................ 359/407; 359/399; 359/428

(58) Field of Classification Search .......... 359/399–409, 359/425–428
See application file for complete search history.

(56) References Cited

U.S. PATENT DOCUMENTS

| 2,180,236 | A | * | 11/1939 | Heinisch ...................... 396/142 |
| 4,318,584 | A | * | 3/1982 | Ando et al. .................. 359/401 |
| 5,020,906 | A | * | 6/1991 | Paz ............................... 356/138 |
| 7,113,331 | B2 | * | 9/2006 | Hirunuma et al. ............ 359/427 |

FOREIGN PATENT DOCUMENTS

| EP | 1 403 679 | * | 3/2004 | ................... 359/399 |
| JP | 2005-316258 A | | 11/2005 | |
| JP | 2007-212497 A | | 8/2007 | |

OTHER PUBLICATIONS

Nikon binoculars combined brochure, Nikon Sport Optics, published Nov. 16, 2006.

* cited by examiner

*Primary Examiner* — Thong Nguyen
(74) *Attorney, Agent, or Firm* — Miles & Stockbridge P.C.

(57) ABSTRACT

A pair of binoculars includes: a pair of lens barrels in each of which a telescopic optical system including an objective lens and an eyepiece is held; a reticle that is provided between the objective lens and the eyepiece of one of the telescopic optical systems movably in an optical axis direction of the one of the telescopic optical systems; and an adjusting ring that moves the reticle in the optical axis direction by rotation operation to adjust a position of the reticle in the optical axis direction.

5 Claims, 5 Drawing Sheets

BINOCULARS

CROSS-REFERENCE TO RELATED APPLICATION

This application is a continuation of International Application No. PCT/JP2008/065792 filed Aug. 27, 2008.

TECHNICAL FIELD

The present invention relates to a pair of binoculars.

BACKGROUND ART

In hunting or marine sports area, a pair of binoculars in which a reticle that is a plane glass on which a scale is deposited is fitted on an imaging plane of an objective lens is used.

Such a pair of binoculars is used in the following manner. At first, an object to be observed is captured in a field of view, and the scale is superimposed on the object.

Then, diopter adjustment of right and left optical systems is carried out, and the object to be observed is focused.

Then, the scale is read out to detect a dimension of the object (in the case where a distance to the object has been known), or a distance to the object (in the case where the dimension of the object has been known).

The work to fix the reticle on the imaging plane of the objective lens is carried out after adjusting the position of the reticle on the optical axis in order to focus not only on the object but also on the scale of the reticle upon focusing on a distant object. Accordingly, when the object is located at a distant position, it is relatively easy for an observer to focus on both of the object and the scale of the reticle superimposed in the field of the observer (see Nikon binoculars combined brochure, published on Nov. 16, 2006).

However, when the object to be observed is located at a near distance, since accommodation varies greatly between individuals, it sometimes happens that the observer cannot focus on the object and the scale of the reticle in the field of view at the same time, so that the dimension of the object or the distance from the object cannot be measured.

The present invention is made in view of the above-described problems, and has an object to provide a pair of binoculars capable of measuring a dimension of an object or a distance to the object by using the scale in the field even if the object is located close to the observer.

DISCLOSURE OF THE INVENTION

In order to solve the problems, the present invention provides a pair of binoculars including a pair of lens barrels in each of which a telescopic optical system including an objective lens and an eyepiece is held, a reticle that is provided between the objective lens and the eyepiece of one of the telescopic optical systems movably in an optical axis direction of the one of the telescopic optical systems, and an adjusting ring that moves the reticle in the optical axis direction by rotation operation to adjust a position of the reticle in the optical axis direction.

The present invention makes it possible to provide a pair of binoculars capable of measuring a dimension of an object to be observed or a distance to the object by using a scale in the field of view even the object is located at close range.

EMBODIMENT FOR CARRYING OUT THE INVENTION

Figure 1:
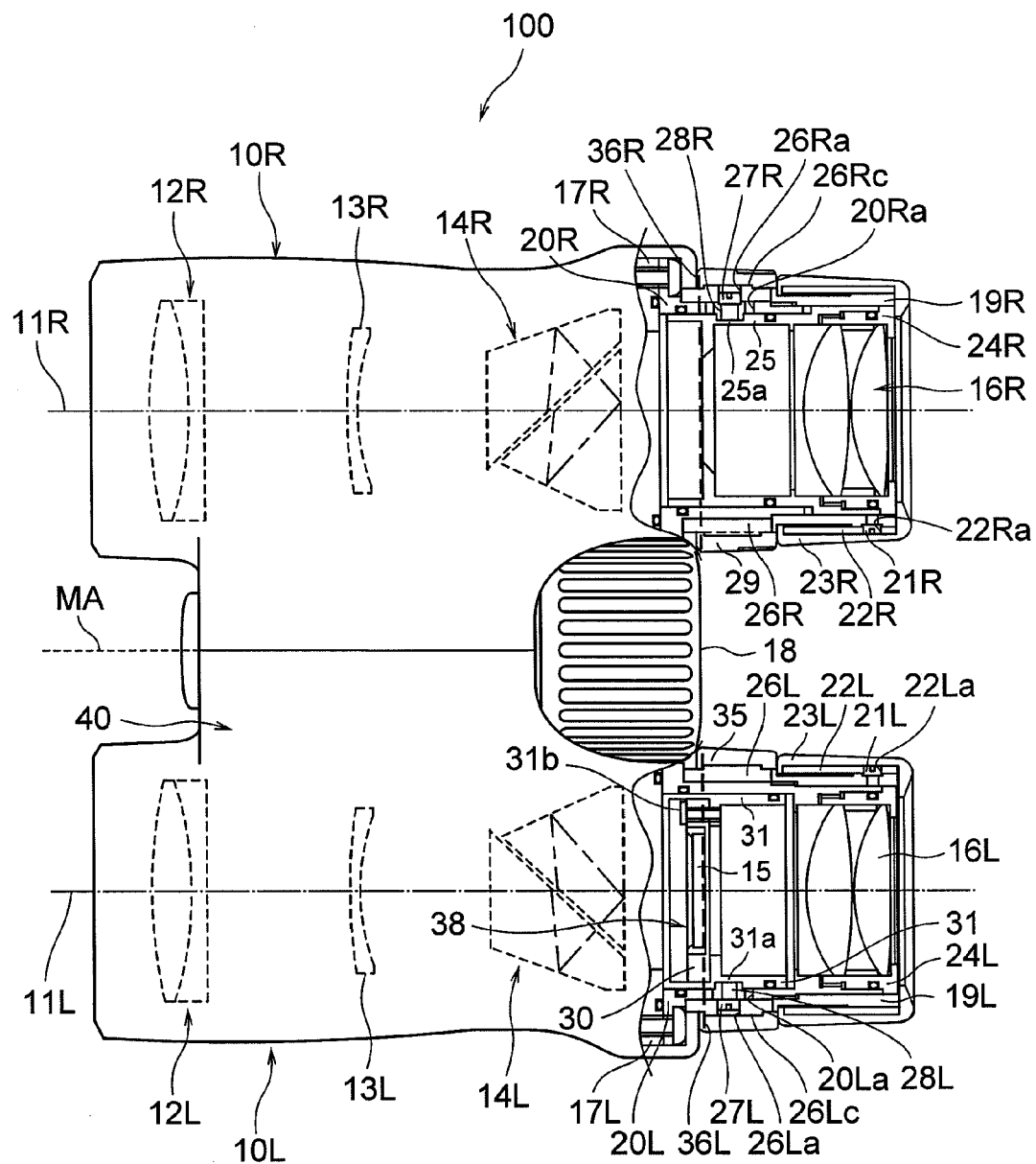
FIG. 1 is a partially cross-sectioned view showing a pair of binoculars according to a first embodiment.
Figure 2:
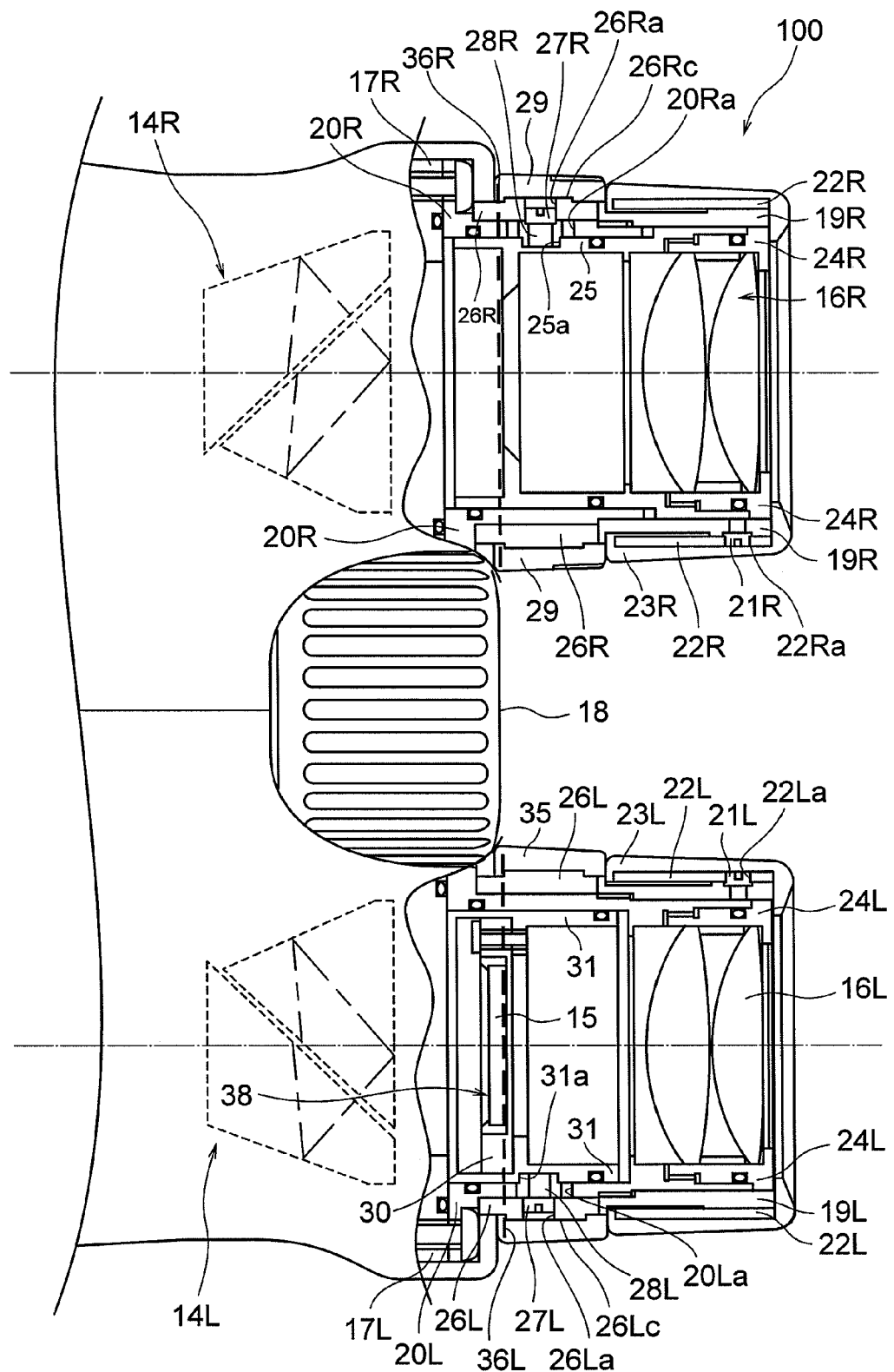
FIG. 2 is a partially enlarged view showing eyepiece portions in FIG. 1.
Figure 3:
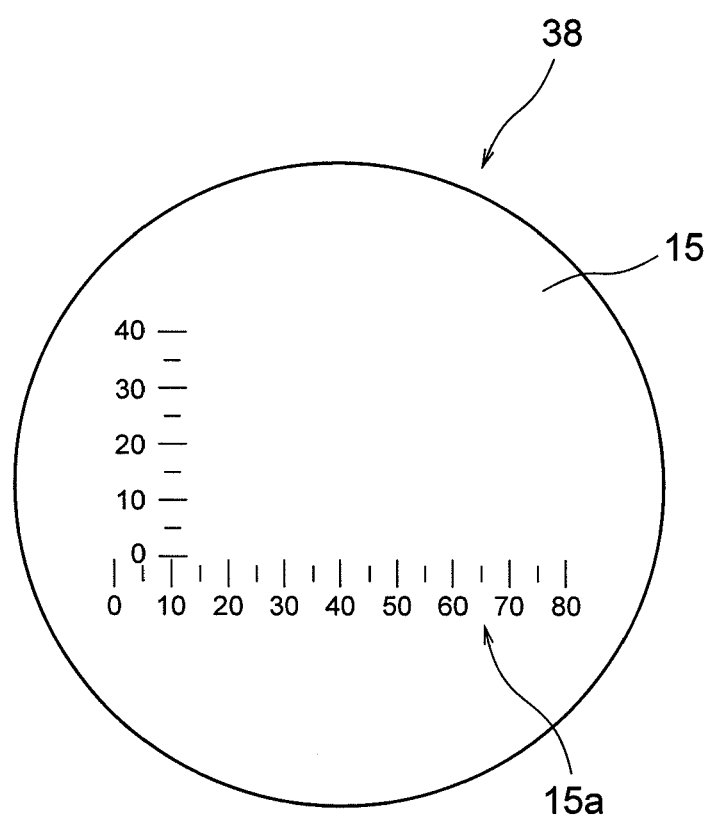
FIG. 3 is an enlarged view of a reticle.

An embodiment of the present invention is explained below with reference to accompanying drawings. FIG. 1 is a partially cross-sectioned view showing a pair of binoculars according to a first embodiment. FIG. 2 is a partially enlarged view showing eyepiece portions in FIG. 1. FIG. 3 is an enlarged view of a reticle.

At first, a whole construction of a pair of binoculars according to the first embodiment is explained.

A pair of binoculars 100 according to the first embodiment is equipped with a pair of right and left lens barrels 10R and 10L, which are connected by a bridge portion 40. The bridge portion 40 can change the angle formed by the lens barrels 10R and 10L by folding the lens barrels 10R and 10L on the axis MA as a rotation center. The binoculars 100 is a central-focusing type binoculars, so that by rotating a focus knob 18 provided on the bridge portion 40, second objective lenses 13R and 13L are moved along optical axes 11R and 11L at the same time. The optical axes 11R and 11L are parallel with each other.

Then, the construction of the lens barrel 10R is explained. As shown in FIG. 1, a first objective lens 12R, the second objective lens 13R, a prism 14R, and an eyepiece 16R are disposed in the lens barrel 10R along the optical axis 11R. A telescopic optical system of the lens barrel 10R is composed of the first objective lens 12R, the second objective lens 13R, the prism 14R, and the eyepiece 16R.

The second objective lens 13R is connected to the focus knob 18 by an unillustrated transmission mechanism, and moved along the optical axis 11R in response to rotation of the focus knob 18.

The first objective lens 12R and the prism 14R are fixed to a main body 17R. An eyepiece tube 20R centering on the optical axis 11R is fixed to the eyepiece 16R side of the main body 17R.

As shown in FIGS. 1 and 2, a fitting ring 19R for fitting a rubber eyecup 23R is fixed to the eyepiece 16R side end of the eyepiece tube 20R. A cam ring 22R is slidably held on the outer circumference of the fitting ring 19R, and the rubber eyecup 23R integrally covers the outer circumference of the cam ring 22R.

A spiral hole 22Ra extending substantially in circumferential direction is formed on the circumference of the cam ring 22R. A cam screw 21R is inserted into the hole 22Ra, and a shaft portion of the cam screw 21R is fixed to the fitting ring 19R. The cam screw 21R has a dimension such that a head portion thereof does not protrude outwardly from the outer circumference of the cam ring 22R. The head portion of the cam screw 21R is slidably fitted to the inner periphery of the hole 22Ra. Accordingly, when the cam ring 22R is rotated around the outer circumference of the fitting ring 19R, the head portion of the cam screw 21R is relatively moved along the spiral shaped hole 22Ra. As a result, the cam ring 22R is moved in the optical axis 11R direction with rotating around the optical axis 11R.

An eyepiece room 25 is provided from the inner circumference of the eyepiece tube 20R through the inner circumference of the fitting ring 19R. The eyepiece room 25 is held movably in the optical axis direction 11R on the inner circumference of the eyepiece tube 20R and the inner circumference of the fitting ring 19R. The eyepiece 16R is held by a holding ring 24R fixed at the fitting ring 19R side end of the eyepiece room 25.

A linear hole 20Ra extending in the optical axis 11R direction is formed on the main body 17R side circumference of the eyepiece tube 20R. A cam ring 26R is rotatably held on the main body 17R side outer circumference of the eyepiece tube 20R. The cam ring 26R is for adjusting the position of the eyepiece 16R in order to adjust diopter difference of the right and left eyes of an observer, that is explained later. A spiral hole 26Ra extending substantially in the circumferential direction is formed on the circumference of the cam ring 26R. The linear hole 20Ra of the eyepiece tube 20R and the spiral hole 26Ra cross each other as superimposed in the radial direction with each other. A cam screw 27R is inserted at the cross point of the hole 26Ra and the hole 20Ra, and a shaft portion of the cam screw 27R is fixed to a cam piece 28R. Side surfaces of the cam piece 28R can be slid against inner circumferences of the hole 20Ra. An end portion of the cam piece 28R is fixed to a circular concavity 25a formed on the outer circumference of the eyepiece room 25. The cam screw 27R has a dimension such that a head portion thereof does not protrude outwardly from the outer circumference of the cam ring 26R, and the head portion can be slid against the inner periphery of the hole 26Ra.

A ring shape rubber covers the outer circumference of the cam ring 26R, and forms an adjusting ring (hereinafter called as a "diopter adjusting ring") 29 for rotating the cam ring 26R. Since an irregular shape 26Rc such as knurl is formed on the outer circumference of the cam ring 26R, friction force between the diopter adjusting ring 29 and the cam ring 26R becomes strong, so that the diopter adjusting ring 29 and the cam ring 26R firmly rotate in a body.

Then, the construction of the lens barrel 10L is explained. As shown in FIG. 1, a first objective lens 12L, a second objective lens 13L, a prism 14L, a plane glass 15 and an eyepiece 16L are disposed in the lens barrel 10L along the optical axis 11L. A telescopic optical system of the lens barrel 10L is composed of the first objective lens 12L, the second objective lens 13L, the prism 14L, the plane glass 15 and the eyepiece 16L.

The second objective lens 13L is connected to the focus knob 18 by an unillustrated transmission mechanism, and moved along the optical axis 11L in response to rotation of the focus knob 18.

The first objective lens 12L and the prism 14L are fixed to a main body 17L. An eyepiece tube 20L centering on the optical axis 11L is fixed to the eyepiece 16L side of the main body 17L.

As shown in FIGS. 1 and 2, a fitting ring 19L for fitting a rubber eyecup 23L is fixed to the eyepiece 16L side end of the eyepiece tube 20L. A cam ring 22L is slidably held on the outer circumference of the cam ring 22L, and the rubber eyecup 23L integrally covers the outer circumference of the fitting ring 19L.

A spiral hole 22La extending substantially in circumferential direction is formed on the circumference of the cam ring 22L. A cam screw 21L is inserted into the hole 22La, and a shaft portion of the cam screw 21L is fixed to the fitting ring 19L. The cam screw 21L has a dimension such that a head portion thereof does not protrude outwardly from the outer circumference of the cam ring 22L. The head portion of the cam screw 21L is slidably fitted to the inner periphery of the hole 22La. Accordingly, when the cam ring 22L is rotated around the outer circumference of the fitting ring 19L, the head portion of the cam screw 21L is relatively moved along the spiral shaped hole 22La. As a result, the cam ring 22L is moved in the optical axis 11L direction with rotating around the optical axis 11L.

A holding ring 24L for holding the eyepiece 16L is fixed at the end portion of the eyepiece tube 20L.

A ring member (hereinafter called as a "scale ring") 31 for holding the plane glass 15 is provided on the inner circumference of the main body 17L side of the eyepiece tube 20L. The scale ring 31 is held movably in the optical axis 11L direction with respect to the inner circumference of the eyepiece tube 20L.

A glass frame 30 is fixed inside of the scale ring 31 by a screw 31b. The plane glass 15 is fixed to the glass frame 30. A scale 15a having an L-shape as shown in FIG. 3 for detecting a distance to an object to be observed or a dimension of the object is formed on the plane glass 15 by vapor deposition. The plane glass 15 on which the scale 15a is deposited composes a reticle 38.

A linear hole 20La extending in the optical axis 11L direction is formed on the main body 17L side circumference of the eyepiece tube 20L. A cam ring 26L is rotatably held on the main body 17L side outer circumference of the eyepiece tube 20L. The cam ring 26L is for adjusting the position of the reticle 38 in the optical axis 11L direction upon observation as explained later. A spiral hole 26La extending substantially in the circumferential direction is formed on the circumference of the cam ring 26L. The linear hole 20La of the eyepiece tube 20L and the spiral hole 26La cross each other superimposed in the radial direction with each other. A cam screw 27L is inserted at the cross point of the hole 26La and the hole 20La, and a shaft portion of the cam screw 27L is fixed to a cam piece 28L. Side surfaces of the cam piece 28L can be slid against inner periphery of the hole 20La. An end portion of the cam piece 28L is fixed to a circular concavity 31a formed on the outer circumference of the scale ring 31. The cam screw 27L has a dimension such that a head portion thereof does not protrude outwardly from the outer circumference of the cam ring 26L, and the head portion can be slid against the inner periphery of the hole 26La.

A ring shape rubber covers the outer circumference of the cam ring 26L, and forms an adjusting ring (hereinafter called as a "scale-adjusting ring") 35 for rotating the cam ring 26L. Since an irregular shape 26Lc such as knurl is formed on the outer circumference of the cam ring 26L, friction force between the scale-adjusting ring 35 and the cam ring 26L becomes strong, so that the scale-adjusting ring 35 and the cam ring 26L firmly rotate in a body.

In this manner in the first embodiment, a mechanism for adjusting diopter and a mechanism for adjusting the position of the reticle 38 are provided in different lens barrels separately. With configuring in this manner, it becomes possible to reduce an operational error.

Then, how to use a pair of binoculars 100 according to the first embodiment is explained.

As for a preparation work before observation, in order to adjust the binoculars 100 to an observer, eyecup twist up operation, interpupillary distance adjustment, and diopter adjustment are carried out.

Eyecup-Twist-Up Operation:

Eyecup-twist-up operation is for an observer not wearing glasses, keeping a distance between the eyepiece and an eye to be optimum, and preventing outside disturbing light from coming into the observer's eyes upon pressing the observer's face against rubber eyecups 23R and 23L. Eyelashes also do not touch the holding rings 24R, 24L of the eyepieces 16R, 16L.

When the rubber eyecup 23R or 23L is held by your fingers and turned, the cam ring 22R or 22L, which are in a body with the rubber eyecup 23R or 23L respectively, are turned on the outer circumference of the fitting ring 19R or 19L. The head portion of the cam screw 21R or 21L fixed to the fitting ring 19R or 19L relatively moves along the spiral hole 22Ra or 22La, respectively. As a result, the rubber eyecup 23R or 23L and the cam ring 22R or 22L are twisted up with rotating around the optical axis 11R or 11L.

Interpupillary Distance Adjustment:

Interpupillary distance adjustment is an operation that a right field of view seen through the optical system in the right lens barrel 10R and a left field of view seen through the optical system in the left lens barrel 10L are superimposed together as one. The right and left lens barrels 10R and 10L are folded around the axis MA of the bridge portion 40 as a center of rotation, so that the angle formed by the right and left lens barrels 11R and 11L is varied.

Diopter Adjustment:

Diopter adjustment is an operation that diopter difference between the right and left eyes is adjusted.

When the diopter adjusting ring 29 is rotated, the cam ring 26R that is in a body with the diopter adjusting ring 29 rotates on the outer circumference of the eyepiece tube 20R. At this moment, the cross point between the spiral hole 26Ra of the cam ring 26R and the linear hole 20Ra of the eyepiece tube 20R moves along the linear hole 20Ra in the optical axis 11R direction to the objective lens 12R side or the eyepiece 16R side according to the rotation angle of the diopter adjusting ring 29. In accordance with this, the cam screw 27R inserted at the cross point between the hole 26Ra and the hole 20Ra and the cam piece 28R on which the cam screw 27R is fixed are also moved along the hole 20Ra in the optical axis 11R direction to the objective lens 12R side or the eyepiece 16R side. When the cam piece 28R is moved in the optical axis 11R direction, the eyepiece room 25 on which the cam piece 28R is fixed is also slid linearly in the optical axis 11R direction, so that the position of the eyepiece 16R can be adjusted.

After completion of preparation works, the observation is started.

At first, the focus knob 18 is rotated, and the objective lens 13R and the objective lens 13L are moved in the optical axis 11R direction and in the optical axis 11L direction, respectively. Combined diopter of the objective lenses 12R and 13R, and that of the objective lenses 12L and 13L are adjusted so as to focus both eyes on the object to be observed.

On this occasion, the combined focal length of the objective lenses 12R and 13R varies together with the combined focal length of the objective lenses 12L and 13L, and the imaging planes 36R and 36L are also moved in the optical axes 11R and 11L directions. When the combined focal length of the objective lens 12L and the objective lens 13L is varied, and the imaging plane 36L is moved along the optical axis 11L, it becomes impossible to focus the left eye on the scale 15a deposited on the reticle 38. In this case, if the scale 15a of the reticle 38 is moved to the position where the imaging plane 36L has been moved, it becomes possible to focus the left eye again on the scale 15a. Therefore, the scale-adjusting ring 35 is rotated.

When the scale-adjusting ring 35 is rotated, the cam ring 26L, which is in a body with the scale-adjusting ring 35, rotates on the outer circumference of the eyepiece tube 20L. On this occasion, the cross point between the spiral hole 26La of the cam ring 26L and the linear hole 20La of the eyepiece tube 20L is moved along the linear hole 20La in the optical axis 11R [sic] direction to the objective lens 12L side or the eyepiece 16L side in accordance with the rotation angle of the scale adjusting ring 35. In accordance with this, the cam screw 27L inserted at the cross point between the hole 26La and the hole 20La and the cam piece 28L on which the cam screw 27L is fixed are also moved along the hole 20La in the optical axis 11R [sic] direction to the objective lens 12L side or the eyepiece 16L side. When the cam piece 28L is moved in the optical axis 11L direction, the scale ring 31 on which the cam piece 28L is fixed is also slid linearly in the optical axis 11L direction, so that the position in the optical axis 11L direction of the reticle 38 can be adjusted. As a result, the observer can focus the left eye on the object to be observed and the scale 15a at the same time in the field of view.

In this manner, according to the first embodiment, the reticle 38 on which the scale 15a is deposited can be moved to the focus position of the objective lenses 12L and 13L. Moreover, the reticle 38 can be moved independently by rotating the scale adjusting ring 35 separately from the focus knob 18 or the diopter adjusting mechanism. As a result, even in the case where the object is located at near distance, the object and the scale 15a can be focused in the field of view at the same time.

Moreover, since the reticle 38 can be moved independently, the present embodiment can be adopted to the following use. When the scale 15a is not necessary in the field of view, the plane glass 15 that is the reticle 38 can be moved to a position where the left eye cannot focus on the scale 15a. With this arrangement, the object can be observed in a state where the scale 15a does not exist in the field of view.

As described above in the present embodiment, the position of the reticle 38 can be adjusted to both of a state where the scale 15a can be observed in the field of view and a state where the scale 15a cannot be observed in the field of view. In this manner, the observer can observe the object with preferred state in the field of view.

Then, a second embodiment of the present invention is explained. The second embodiment is explained such that a construction similar to the first embodiment is attached the same symbol as the first embodiment.

Figure 4:
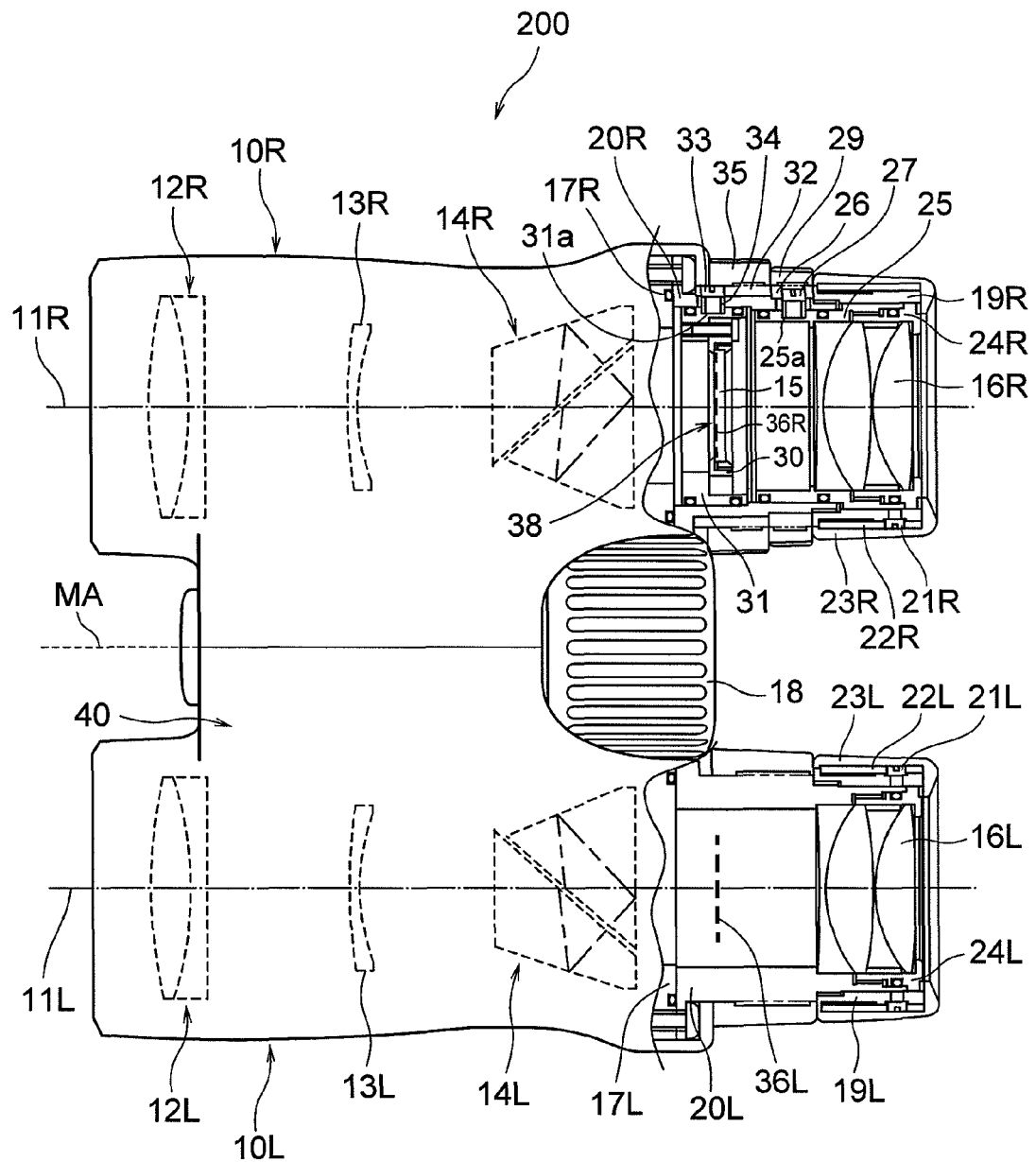
FIG. 4 is a partially cross-sectioned view showing a pair of binoculars according to a second embodiment.
Figure 5:
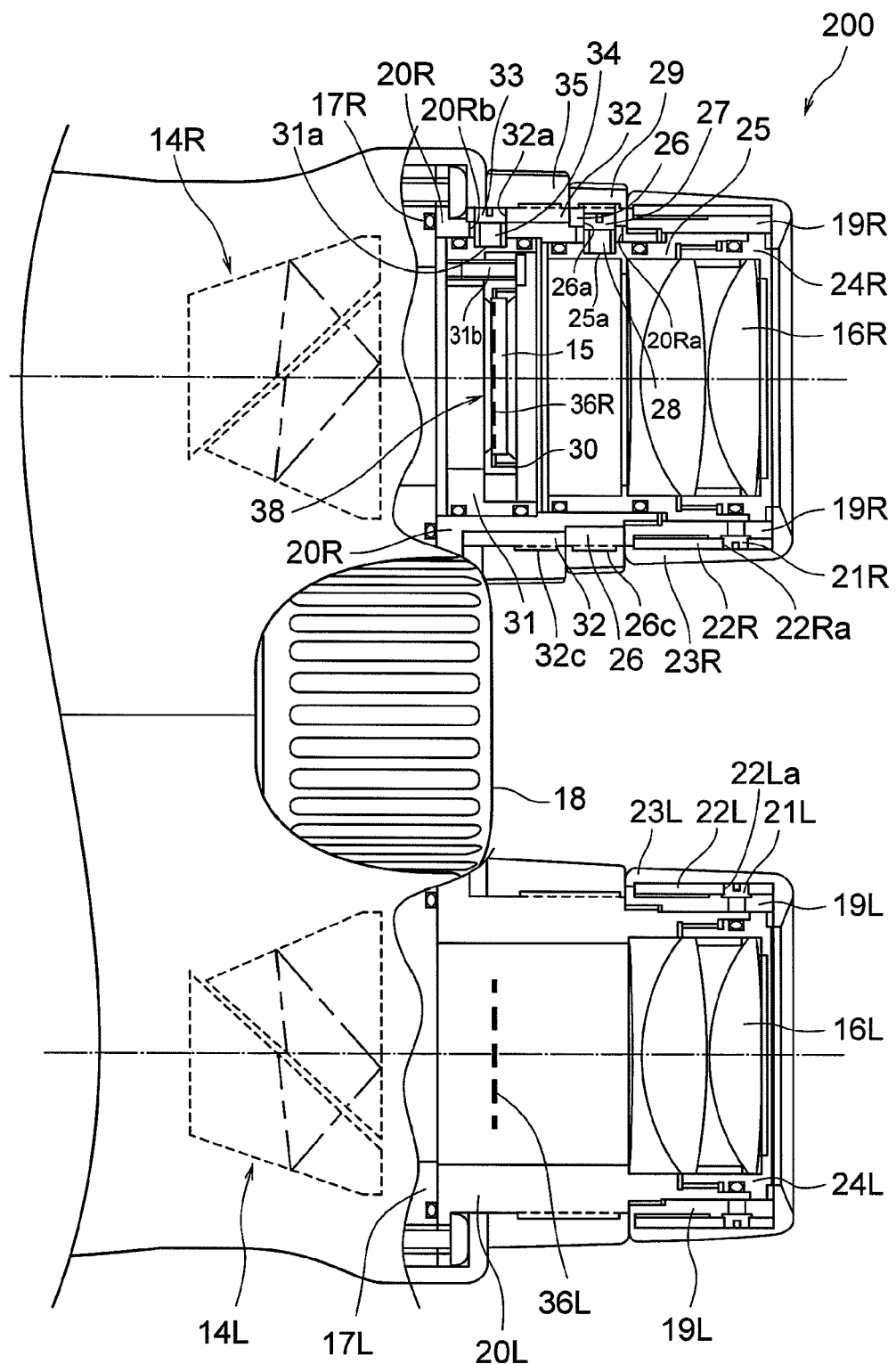
FIG. 5 is a partially enlarged view showing eyepiece portions in FIG. 4.

FIG. 4 is a partially cross-sectioned view showing a pair of binoculars according to a second embodiment. FIG. 5 is a partially enlarged view showing eyepiece portions in FIG. 4.

At first, a whole construction of a pair of binoculars according to the second embodiment is explained.

Similar to the first embodiment, a pair of binoculars 200 according to the second embodiment is equipped with lens barrels 10R and 10L, which are connected by a bridge portion 40. The bridge portion 40 can change the angle formed by the lens barrels 10R and 10L by folding the lens barrels 10R and 10L on the axis MA as a rotation center. The binoculars 200 is a central-focusing type binoculars, so that by rotating a focus knob 18 provided on the bridge portion 40, second objective lenses 13R and 13L are moved along optical axes 11R and 11L at the same time. The optical axes 11R and 11L are parallel with each other.

Then, the construction of the lens barrel 10R is explained.

As shown in FIG. 4, a first objective lens 12R, the second objective lens 13R, a prism 14R, a plane glass 15 and an eyepiece 16R are disposed in the lens barrel 10R along the optical axis 11R. A telescopic optical system of the lens barrel 10R is composed of the first objective lens 12R, the second objective lens 13R, the prism 14R, the plane glass 15, and the eyepiece 16R.

The second objective lens 13R is connected to the focus knob 18 by an unillustrated transmission mechanism, and moved along the optical axis 11R in response to rotation of the focus knob 18.

The first objective lens 12R and the prism 14R are fixed to a main body 17R. An eyepiece tube 20R centering on the optical axis 11R is fixed to the eyepiece 16R side of the main body 17R.

As shown in FIGS. 4 and 5, a fitting ring 19R for fitting a rubber eyecup 23R is fixed to the eyepiece 16R side end of the eyepiece tube 20R. A cam ring 22R is slidably held on the outer circumference of the fitting ring 19R, and the rubber eyecup 23R integrally covers the outer circumference of the cam ring 22R.

A spiral hole 22Ra extending substantially in circumferential direction is formed on the circumference of the cam ring 22R. A cam screw 21R is inserted into the hole 22Ra, and a shaft portion of the cam screw 21R is fixed to the fitting ring 19R. The cam screw 21R has a dimension such that a head portion thereof does not protrude outwardly from the outer circumference of the cam ring 22R. The head portion of the cam screw 21R is slidably fitted to the inner periphery of the hole 22Ra. Accordingly, when the cam ring 22R is rotated around the outer circumference of the fitting ring 19R, the head portion of the cam screw 21R is relatively moved along the spiral shaped hole 22Ra. As a result, the cam ring 22R is moved in the optical axis 11R direction with rotating around the optical axis 11R.

An eyepiece room 25 is provided from the inner circumference around the center portion of the eyepiece tube 20R in the optical axis 11R direction to the inner circumference of the fitting ring 19R. The eyepiece room 25 is held by the inner circumference of the eyepiece tube 20R and the inner circumference of the fitting ring 19R movably in the optical axis 11R direction. The eyepiece 16R is held in a holding ring 24R fixed to the fitting ring 19R side end of the eyepiece room 25.

A linear hole 20Ra extending in the optical axis 11R direction is formed on the inner circumference around the center portion of the eyepiece tube 20R in the optical axis 11R direction. A cam ring 26 is rotatably held on the outer circumference around the said center portion of the eyepiece tube 20R. The cam ring 26 is for adjusting the position of the eyepiece 16R in order to adjust diopter difference of the right and left eyes of the observer. A spiral hole 26a that crosses the linear hole 20Ra of the eyepiece tube 20R as superimposed with each other in the radial direction is formed on the cam ring 26. A cam screw 27 is inserted into the cross point between the hole 26a and the hole 20Ra, and a shaft portion of the cam screw 27 is fixed to a cam piece 28. Side peripheral surface of the cam piece 28 can be slid on the inner periphery of the hole 20Ra. An end portion of the cam piece 28 is fixed to a circular concavity 25a formed on the outer circumference of the eyepiece room 25. The cam screw 27 has a dimension such that a head portion thereof does not protrude outwardly from the outer circumference of the cam ring 26, and the head portion can be slid against the inner periphery of the hole 26a.

A ring shape rubber covers the outer circumference of the cam ring 26, and forms an adjusting ring (hereinafter called as a "diopter-adjusting ring") 29 for rotating the cam ring 26. Since an irregular shape 26c such as knurl is formed on the outer circumference of the cam ring 26, friction force between the diopter-adjusting ring 29 and the cam ring 26 becomes strong, so that the diopter-adjusting ring 29 and the cam ring 26 firmly rotate in a body.

A ring shape member (hereinafter called as a "scale ring") 31 for holding a plane glass 15 is provided on the inner circumference of the main body 17R side of the eyepiece tube 20R. The scale ring 31 is held movably in the optical axis 11R direction on the inner circumference of the eyepiece tube 20R.

A glass frame 30 is fixed inside of the scale ring 31 by a screw 31b. The plane glass 15 is fixed to the glass frame 30. A scale 15a having an L-shape as shown in FIG. 3 for detecting a distance to an object to be observed or a dimension of the object is formed on the plane glass 15 by vapor deposition. The plane glass 15 on which the scale 15a is deposited composes a reticle 38.

A linear hole 20Rb extending in the optical axis 11L [sic] direction is formed on the main body 17R side circumference of the eyepiece tube 20R. A cam ring 32 is rotatably held on the main body 17R side outer circumference of the eyepiece tube 20R. The cam ring 32 is for adjusting the position of the reticle 38 in the optical axis 11R direction upon observation as explained later. A spiral hole 32a crossing the linear hole 20Rb of the eyepiece tube as superimposed with each other in the radial direction is formed on the cam ring 32. A cam screw 33 is inserted in the cross point between the hole 20Rb and the hole 32a, and the shaft portion of the cam screw 33 is fixed to a cam piece 34. Side surfaces of the cam piece 34 can be slid on the inner circumference of the hole 20Rb. An end portion of the cam piece 34 is fixed to a circular concavity 31a formed on the outer circumference of the scale ring 31. The cam screw 33 has a dimension such that a head portion thereof does not protrude outwardly from the outer circumference of the cam ring 32, and the head portion can be slid against the inner circumference of the hole 20Rb.

A ring shape rubber covers the outer circumference of the cam ring 32, and forms an adjusting ring (hereinafter called as a "scale-adjusting ring") 35 for rotating the cam ring 32. Since an irregular shape 32c such as knurl is formed on the outer circumference of the cam ring 32, friction force between the scale-adjusting ring 35 and the cam ring 32 becomes strong, so that the scale-adjusting ring 35 and the cam ring 32 firmly rotate in a body.

In this manner in the second embodiment, a mechanism for adjusting diopter and a mechanism for adjusting the position of the reticle 38 are provided in the same lens barrel (in the present embodiment the lens barrel 10R). As described above, the mechanism for adjusting the position of the reticle 38 can be provided in the same lens barrel where a mechanism for adjusting diopter is provided.

Then, the construction of the lens barrel 10L is explained.

As shown in FIG. 4, a first objective lens 12L, a second objective lens 13L, a prism 14L and an eyepiece 16L are disposed in the lens barrel 10L along the optical axis 11L. A telescopic optical system of the lens barrel 10L is composed of the first objective lens 12L, the second objective lens 13L, the prism 14L and the eyepiece 16L.

The second objective lens 13L is connected to the focus knob 18 by an unillustrated transmission mechanism, and moved along the optical axis 11L in response to rotation of the focus knob 18.

The first objective lens 12L and the prism 14L are fixed to a main body 17L. An eyepiece tube 20L centering on the optical axis 11L is fixed to the eyepiece 16L side of the main body 17L.

As shown in FIGS. 4 and 5, a fitting ring 19L for fitting a rubber eyecup 23L is fixed to the eyepiece 16L side end of the eyepiece tube 20L. A cam ring 22L is slidably held on the outer circumference of the fitting ring 19L, and the rubber eyecup 23L integrally covers the outer circumference of the cam ring 22L.

A spiral hole 22La extending substantially in circumferential direction is formed on the circumference of the cam ring 22L. A cam screw 21L is inserted into the hole 22La, and a shaft portion of the cam screw 21L is fixed to the fitting ring 19L. The cam screw 21L has a dimension such that a head portion thereof does not protrude outwardly from the outer circumference of the cam ring 22L. The head portion of the cam screw 21L can be slid against the inner periphery of the hole 22La. Accordingly, when the cam ring 22L is rotated around the outer circumference of the fitting ring 19L, the head portion of the cam screw 21L is relatively moved along the spiral shaped hole 22La. As a result, the cam ring 22L is moved in the optical axis 11L direction with rotating around the optical axis 11L.

A holding ring 24L for holding the eyepiece 16L is fixed at the end portion of the eyepiece tube 20L.

Then, how to use a pair of binoculars 200 according to the second embodiment is explained.

As for a preparation work before observation, in order to adjust the binoculars 200 to an observer, eyecup twist up operation, interpupillary distance adjustment, and diopter adjustment are carried out. Although these operations are similar to the first embodiment, in the second embodiment, the diopter adjustment ring 29 for adjusting diopter is provided on the right lens barrel 10R.

After completion of the preparation, observation starts. The user of the binoculars rotates the focus knob 18 to move the second objective lenses 13L and 13R along the optical axes 11L and 11R, and adjusts combined diopter composed of the first objective lenses 12L and 12R and the second objective lenses 13L and 13R, respectively, and focuses both eyes on the object to be observed.

On this occasion, the combined focal length of the objective lenses 12R and 13R varies together with the combined focal length of the objective lenses 12L and 13L, and the imaging planes 36R and 36L are also moved in the optical axes 11R and 11L directions. When the imaging planes 36R and 36L are moved, since there are no optical elements on the lens barrel 10L side imaging plane 36L, there are no problems on this side, however, it becomes impossible to focus the right eye on the scale 15a of the reticle 38. On the other hand, when the deposited surface of the scale 15a of the reticle 38 is moved to the position of the moved imaging plane 36R, the right eye can focus again on the scale 15a. Then, the scale-adjusting ring 35 is rotated.

When the scale-adjusting ring 35 is rotated, the cam ring 32, which is in a body with the scale-adjusting ring 35, rotates on the outer circumference of the eyepiece tube 20R. On this occasion, the cross point between the spiral hole 32a of the cam ring 32 and the linear hole 20Rb of the eyepiece tube 20R is moved along the linear hole 20Rb in the optical axis 11R direction to the objective lens 12R side or the eyepiece 16R side in accordance with the rotation angle of the scale adjusting ring 35. In accordance with this, the cam screw 33 inserted at the cross point between the hole 32a and the hole 20Rb and the cam piece 34 on which the cam screw 33 is fixed are also moved along the hole 20Rb in the optical axis 11R direction to the objective lens 12R side or the eyepiece 16R side. When the cam piece 34 is moved in the optical axis 11R direction, the scale ring 31 on which the cam piece 34 is fixed is also slid linearly in the optical axis 11R direction, so that the position in the optical axis 11R direction of the reticle 38 can be adjusted. As a result, the observer can focus the right eye on the object to be observed and the scale 15a at the same time in the field of view.

In this manner, according to the second embodiment similar to the first embodiment, the reticle 38 on which the scale 15a is deposited can be moved to the focus position of the objective lenses 12R and 13R. Moreover, the reticle 38 can be moved independently by rotating the scale adjusting ring 35 separately from the focus knob 18 or the diopter adjusting mechanism. As a result, even in the case where the object is located at a near distance, the object and the scale 15a can be focused in the field of view at the same time.

Moreover, since the reticle 38 can be moved independently, the present embodiment can be adopted to the following use. When the scale 15a is not necessary in the field of view, the reticle 38 can be moved to a position where the right eye cannot focus on the scale 15a. With this arrangement, the object can be observed in a state where the scale 15a does not exist in the field of view. In the second embodiment similar to the first embodiment, the position of the reticle 38 can be adjusted to both of a state where the scale 15a can be observed in the field of view and a state where the scale 15a cannot be observed in the field of view. In this manner, the observer can observe the object with preferred state in the field of view.

In each of the above-described embodiments, although the present invention is explained by a pair of binoculars having a pair of right and left lens barrels, the present invention may be such that a reticle movable in the optical axis direction is provided between an objective lens and an eyepiece in a lens barrel of a telescope that is a monocular, and the reticle is moved upon focusing an eye on the object to be observed. Moreover, the scale line may be formed by such as a wire.

As described above, the present invention is not limited to each embodiment, and can suitably be altered.

What is claimed is:

1. A pair of binoculars comprising:
   a pair of lens barrels in each of which are held a telescopic optical system including an objective lens movable along an optical axis for focusing on an object to be observed and an eyepiece;
   a reticle that is provided between the objective lens and the eyepiece of one of the telescopic optical systems movable along an optical axis of the one of the telescopic optical systems; and
   an adjusting mechanism for moving the reticle along the optical axis independently from movement of the objective lens along the optical axis.

2. The pair of binoculars according to claim 1, wherein the position of the reticle along the optical axis can be adjusted independently from a diopter adjusting mechanism that adjusts diopter difference of the respective telescopic optical systems held in each of the pair of lens barrels.

3. The pair of binoculars according to claim 2, wherein the reticle is a plane glass on which a scale is disposed.

4. The pair of binoculars according to claim 3, wherein a field of view of the one of the telescopic optical systems can be adapted to both of a state where both of the object to be observed and the scale are focused and the scale can be seen in the field of view, and a state where the object to be observed is focused and the scale is not seen in the field of view.

5. The pair of binoculars according to claim 1, wherein the adjusting ring for moving the reticle is provided to an eyepiece side of the one of the telescopic optical systems and is rotatable around the optical axis of the one of the telescopic optical systems.

* * * * *